United States Patent
Awad Alla et al.

(10) Patent No.: US 10,926,603 B2
(45) Date of Patent: Feb. 23, 2021

(54) VEHICLE COMPUTER COOLING

(71) Applicant: Ford Global Technologies, LLC, Dearborn, MI (US)

(72) Inventors: Michael Adel Awad Alla, Novi, MI (US); Ray Siciak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 170 days.

(21) Appl. No.: 16/256,517

(22) Filed: Jan. 24, 2019

(65) Prior Publication Data

US 2020/0238787 A1 Jul. 30, 2020

(51) Int. Cl.
*B60H 1/00* (2006.01)
*G06F 1/20* (2006.01)

(52) U.S. Cl.
CPC .......... *B60H 1/00271* (2013.01); *G06F 1/20* (2013.01)

(58) Field of Classification Search
CPC ................................................ B60H 1/00271
See application file for complete search history.

(56) References Cited

U.S. PATENT DOCUMENTS

| | | | |
|---|---|---|---|
| 6,005,761 A * | 12/1999 | Izawa | H03K 17/0822 361/103 |
| 9,202,316 B1 | 12/2015 | Trudell | |
| 9,638,480 B1 | 5/2017 | Maranville | |
| 9,855,816 B2 | 1/2018 | Meyhofer et al. | |
| 10,017,187 B2 | 7/2018 | Duder | |
| 2009/0145674 A1* | 6/2009 | Lee | B60L 53/14 180/65.1 |
| 2011/0153140 A1* | 6/2011 | Datta | B60R 16/02 701/31.4 |
| 2012/0083960 A1* | 4/2012 | Zhu | B60R 1/00 701/23 |
| 2015/0025722 A1* | 1/2015 | Pearce | F02D 41/22 701/22 |
| 2015/0338852 A1 | 11/2015 | Ramanujam | |
| 2017/0124873 A1* | 5/2017 | Semsey | G08G 1/14 |
| 2017/0334304 A1* | 11/2017 | Steele | B60L 53/66 |
| 2018/0314248 A1* | 11/2018 | Dudar | G07C 5/0808 |
| 2019/0171258 A1* | 6/2019 | Rice | H05K 7/20854 |

FOREIGN PATENT DOCUMENTS

CN 2018105925 A1 6/2018

* cited by examiner

*Primary Examiner* — Alex C Dunn
(74) *Attorney, Agent, or Firm* — Frank A. MacKenzie; Bejin Bieneman PLC

(57) ABSTRACT

A system includes a computer including a processor and a memory storing instructions executable by the processor to predict an overheat time at which a vehicle computer temperature will exceed a threshold and actuate a cooling component when the overheat time is prior to an initiation time of a trip.

20 Claims, 3 Drawing Sheets

VEHICLE COMPUTER COOLING

BACKGROUND

Vehicles typically include one or more computers to actuate components, such as steering, propulsion, and braking. The computers perform calculations and other operations. As the computers perform calculations, excess heat is generated. The excess heat increases the temperature of the computers and can cause faults to occur and/or a computer to become disabled or non-operational.

DETAILED DESCRIPTION

Figure 1:
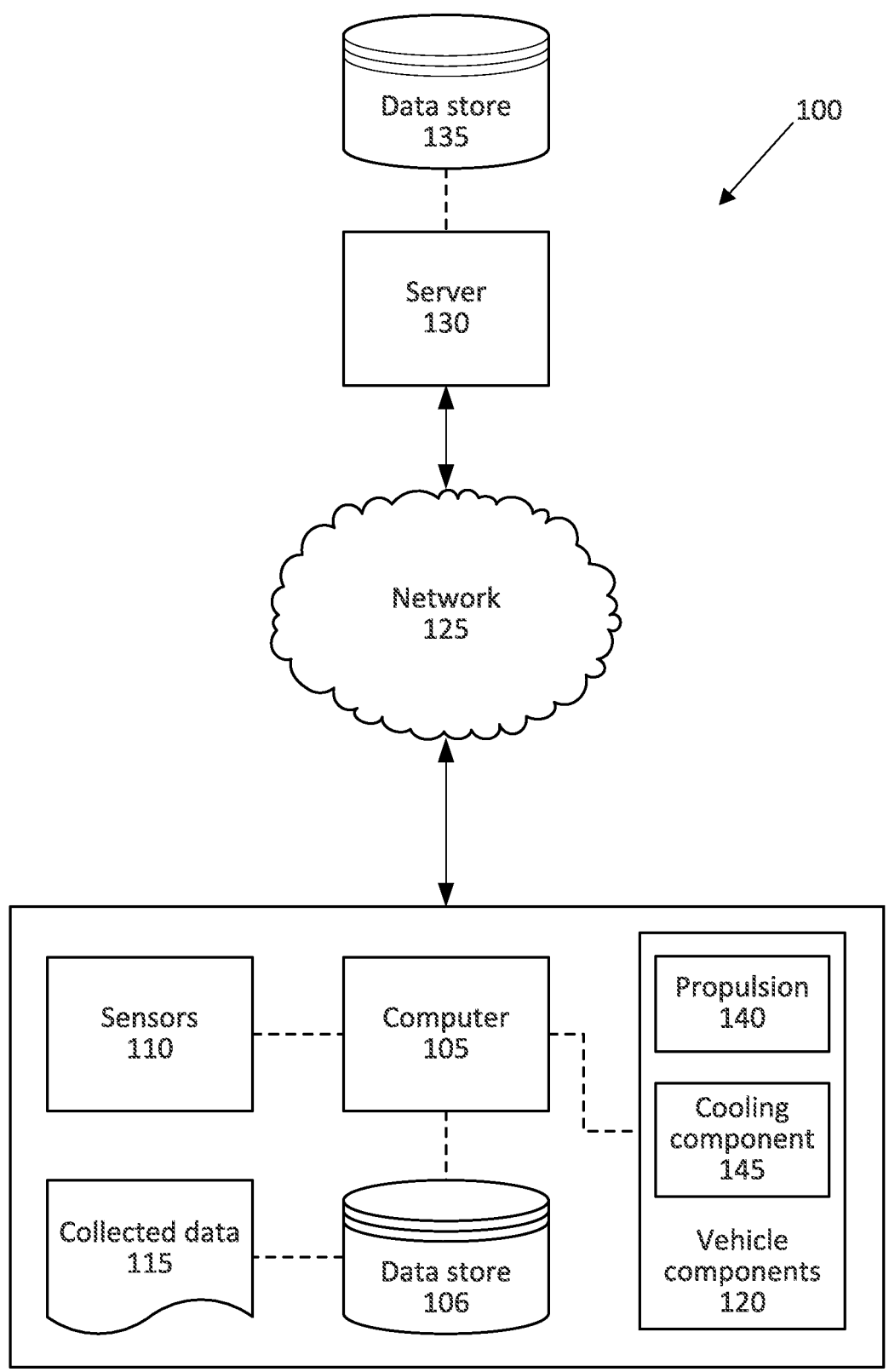
FIG. 1 is a block diagram of an example system for cooling a vehicle computer.

A system includes a computer including a processor and a memory storing instructions executable by the processor to predict an overheat time at which a vehicle computer temperature will exceed a threshold and actuate a cooling component when the overheat time is prior to an initiation time of a trip.

The instructions can further include instructions to deactivate the cooling component when a current vehicle computer temperature is below a second threshold.

The instructions can further include instructions to, while on the trip, actuate the cooling component when a current vehicle computer temperature exceeds the threshold.

The instructions can further include instructions to deactivate the cooling component when the current vehicle computer temperature is below a second threshold.

The instructions can further include instructions to predict the vehicle computer temperature based on an ambient temperature.

The instructions can further include instructions to predict an end time for the trip and to actuate the cooling component when a predicted vehicle computer temperature prior to the end time exceeds a second threshold.

The instructions can further include instructions to, based on an end time of a first trip and an initiation time for a second trip, deactivate a vehicle propulsion.

The instructions can further include instructions to predict the overheat time based on a current vehicle computer temperature at a deactivation time of the vehicle propulsion.

The instructions can further include instructions to determine a deactivation time of the vehicle propulsion and to actuate the cooling component to reduce a predicted vehicle computer temperature below a second threshold prior to the deactivation time.

The instructions can further include instructions to activate the vehicle propulsion at the predicted overheat time when the predicted overheat time is prior to the initiation time of the second trip.

The instructions can further include instructions to assign a trip to a vehicle having an initiation time prior to the predicted overheat time of the vehicle.

The instructions can further include instructions to, upon completion of the trip, actuate a vehicle propulsion to move a vehicle to a standby location.

A method includes predicting an overheat time at which a vehicle computer temperature will exceed a threshold and actuating a cooling component when the overheat time is prior to an initiation time of a trip.

The method can further include deactivating the cooling component when a current vehicle computer temperature is below a second threshold.

The method can further include, while on the trip, actuating the cooling component when a current vehicle computer temperature exceeds the threshold.

The method can further include deactivating the cooling component when the current vehicle computer temperature is below a second threshold.

The method can further include predicting the vehicle computer temperature based on an ambient temperature.

The method can further include predicting an end time for the trip and actuating the cooling component when a predicted vehicle computer temperature prior to the end time exceeds a second threshold.

The method can further include, based on an end time of a first trip and an initiation time for a second trip, deactivating a vehicle propulsion.

The method can further include predicting the overheat time based on a current vehicle computer temperature at a deactivation time of the vehicle propulsion.

The method can further include determining a deactivation time of the vehicle propulsion and actuating the cooling component to reduce a predicted vehicle computer temperature below a second threshold prior to the deactivation time.

The method can further include activating the vehicle propulsion at the predicted overheat time when the predicted overheat time is prior to the initiation time of the second trip.

The method can further include assigning a trip to a vehicle having an initiation time prior to the predicted overheat time of the vehicle.

The method can further include, upon completion of the trip, actuating a vehicle propulsion to move a vehicle to a standby location.

A system includes a cooling component, a vehicle computer, means for predicting an overheat time at which a vehicle computer temperature will exceed a threshold, and means for actuating the cooling component to cool the vehicle computer when the overheat time is prior to an initiation time of a trip.

The system can further include means for deactivating the cooling component when a current vehicle computer temperature is below a second threshold.

The system can further include means for deactivating a vehicle propulsion based on an end time of a first trip and an initiation time for a second trip.

The system can further include means for determining a deactivation time of the vehicle propulsion and means for actuating the cooling component to reduce a predicted vehicle computer temperature below a second threshold prior to the deactivation time.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A computer in a vehicle can monitor a temperature of the computer and actuate a cooling component to reduce the computer temperature when the computer temperature exceeds a threshold. The computer can predict the computer temperature and actuate the cooling component at a time when the computer temperature is predicted to exceed the threshold. The computer can actuate the cooling component until the computer temperature is below a second threshold, the second threshold being lower than the threshold. Cooling the computer to below the second threshold accounts for thermal drift (i.e., time-delayed heating and cooling effects from thermal transfer) and allows the computer temperature to increase without exceeding the threshold.

A server can assign a trip, i.e., a service request to pick up a user at a origin and drop off the user at a destination, to the vehicle. If the vehicle is on a trip and the computer temperature exceeds the threshold, the computer can actuate the cooling component. If the vehicle is not on a trip, the computer can deactivate a propulsion to conserve fuel. After deactivating the propulsion, the computer temperature can increase because of, e.g., ambient temperature, an amount of sunlight, etc. If the computer determines to actuate the cooling component while the propulsion is deactivated (e.g., because the computer temperature exceeds the threshold), the computer can actuate the propulsion to power the cooling component. By predicting the computer temperature and actuating the propulsion and cooling component when the computer temperature is predicted to exceed the threshold, the computer can reduce the computer temperature to improve operation of the computer.

FIG. 1 illustrates an example system 100 for cooling a computer 105 of a vehicle 101. The system 100 includes a computer 105. The computer 105, typically included in a vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

One of the components 120 is a propulsion 140. The propulsion 140 propels the vehicle 101. The propulsion 140 can be, e.g., an internal combustion engine, an electric motor, a hydraulic motor, etc. The propulsion 140 can provide power to other components 120 of the vehicle 101, e.g., an HVAC, an axle, etc. For example, the propulsion 140 can rotate an alternator that generates electricity to power a display screen in a vehicle 101 cabin.

Another of the components 120 is a cooling component 145. The cooling component 145 cools the computer 105, i.e., reduces the temperature of the computer 105. During operation, the computer 105 typically generates heat, increasing a temperature of the computer 105 and likely decreasing performance of the computer 105. To reduce the temperature of the computer 105, the cooling component 145 removes waste heat from the computer 105. The cooling component 145 can be, e.g., a fan, a heat exchanger, a phase change cooler, etc. The cooling component 145 can be powered by the propulsion 140. That is, the cooling component 145 can require electricity provided by an alternator rotated by the propulsion 140. The cooling component 145 may require more electricity than a vehicle 101 battery can supply. Thus, to operate the cooling component 145, the propulsion 140 can also be activated.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle propulsion 140, braking, and steering are controlled by the computer 105. A semi-autonomous mode is one in which at least one of vehicle propulsion 140, braking, and steering are controlled at least partly by the computer 105 as opposed to a human operator. In a non-autonomous mode, i.e., a manual mode, the vehicle propulsion 140, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
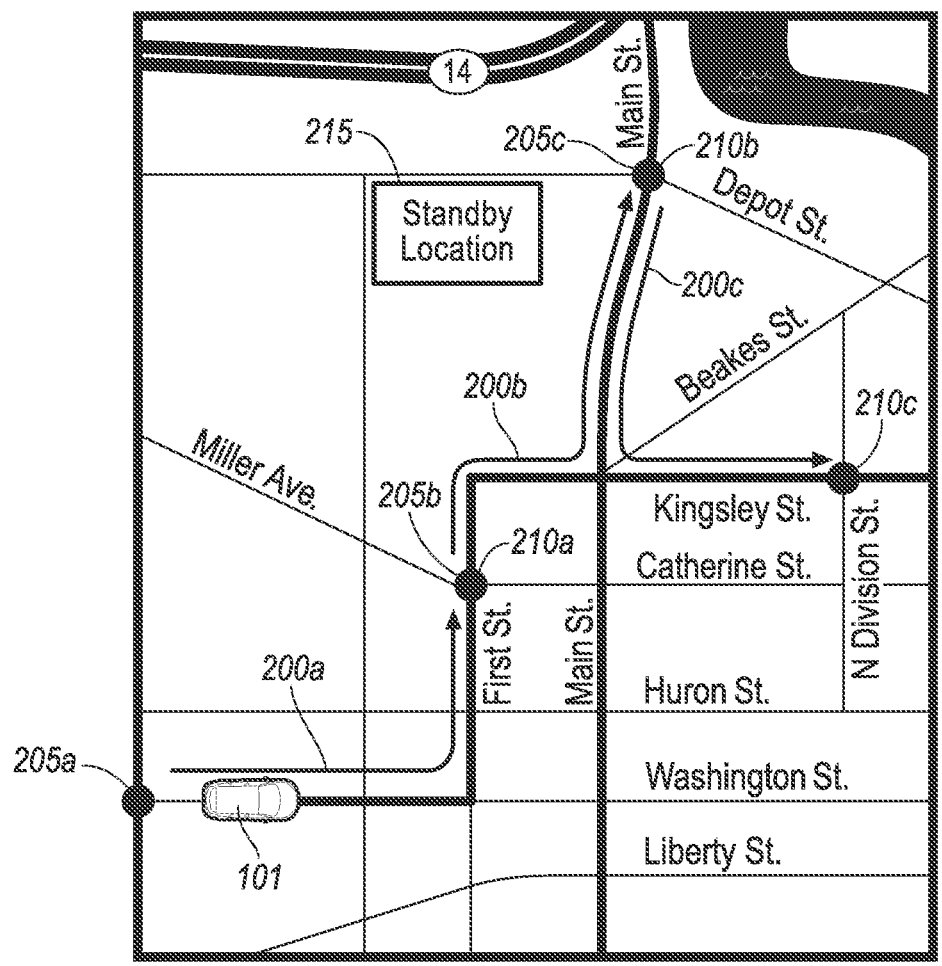
FIG. 2 is an example map including example trips for the vehicle.

FIG. 2 is a diagram of an example vehicle 101 on a trip 200. As used herein, a "trip" is an assignment of a origin 205 to which the vehicle 101 must travel to receive a user and a destination 210 to which the vehicle 101 must travel to drop off the user. The trip 200 begins at an "initiation time," i.e., a predetermined time at which the vehicle 101 will move to the assigned origin 205. The initiation time may be, e.g., a few minutes prior to a scheduled time at which the user requests to be picked up. The trip ends at an "end time," i.e., a time at which the vehicle 101 arrives at the destination 210 and the user exits the vehicle 101. While on the trip 200, the computer 105 can predict the end time, e.g., based on a vehicle 101 speed, traffic conditions, a distance to the destination 210, etc. FIG. 2 illustrates three trips 200a, 200b, 200c, each having a respective origin 205a, 205b, 205c and a respective destination 210a, 210b, 210c.

The server 130 can assign a trip 200 to a vehicle 101. The server 130 can receive a request from a user that includes a scheduled pickup time, a origin 205, and a destination 210. The server 130 can identify a vehicle 101 and assign the trip 200 corresponding to the user request. The server 130 can identify the vehicle 101 based on, e.g., a predicted location of the vehicle 101 prior to the scheduled pickup time, a current status of whether the vehicle 101 is on a trip 200, a vehicle computer temperature, as described below, etc. For example, the server 130 can assign the trip 200b to the vehicle 101 because the destination 210a of the trip 200a, already assigned to the vehicle 101, is the same location as the origin 205b of the trip 200b.

The computer 105 can move the vehicle 101 to a standby location 215 when not currently assigned a trip 200. The standby location 215 can be, e.g., a parking lot, a parking garage, a service station, etc. Upon completion of a trip 200, if the server 130 has not already assigned another trip 200 to the vehicle 101, the computer 105 can actuate the propulsion 140 to move the vehicle 101 to the standby location 215. For example, if the server 130 assigns the trip 200c to the vehicle 101 having an initiation time after the end time of the trip 200b, the computer 105 can actuate the propulsion 140 to move the vehicle 101 to the standby location 215 until the initiation time of the trip 200c.

The computer 105 can determine a deactivation time for the propulsion 140. As used herein, a "deactivation time" for the propulsion 140 is a time at which the computer 105 determines to deactivate the propulsion 140 after completing a trip 200. To conserve fuel, the computer 105 can deactivate the propulsion 140 after the end time of a previous trip 200 and before an initiation time of an upcoming trip 200.

The computer 105 can include a temperature sensor 110 that measures a computer temperature. The temperature sensor 110 can be, e.g., a thermocouple, a thermistor, etc. For example, the temperature sensor 110 can be fixed to an outer portion of a processor of the computer 105 and can communicate temperature data 115 with the computer 105 over the network 120. The outer portion can be a metallic portion of the processor that increases in temperature as the computer 105 performs operations. When the computer 105 performs computations, the computer temperature increases. When the computer temperature exceeds a threshold, the computer 105 may not operate at full capacity. For example, the computer 105 can reduce an amount of computations performed to generate less heat. The threshold can be determined based on, e.g., empirical testing of computer 105 performance at different computer temperatures. The threshold can be, e.g., 50° C. When the computer 105 determines that the computer temperature exceeds the threshold, the computer 105 can actuate one or more components 120 (e.g., a cooling component 145) to reduce the computer temperature and restore computing capacity to the computer 105, allowing the computer 105 to perform more computations.

The computer 105 can predict the computer temperature to determine whether the computer temperature will exceed the threshold prior to the initiation time of the next assigned trip 200. The computer 105 can predict the computer temperature based on a current computer temperature and conventional thermal models, e.g., conduction, convection, and thermal radiation models. For example, the computer 105 can predict the computer temperature from the deactivation time until the next initiation time based on the current computer temperature at the deactivation time, an ambient air temperature, an insolation (i.e., an amount of sunlight). Such a model can include, e.g., buoyant convection heat transfer correlations for ambient air, radiation correlations for insolation, etc. In another example, the computer 105 can refer to a predetermined thermal model based on empirical testing of computer temperature increases for ambient temperatures. One such thermal model can be expressed as a linear function of temperature increasing over time:

$$T(t)=T_0+5.5t \tag{1}$$

where T is the computer temperature in degrees Celsius, $T_0$ is the computer temperature at the deactivation time, and t is time in minutes after the deactivation time. The time t* at which the computer 105 predicts that the computer temperature will exceed the threshold, e.g., T(t*)=50° C., is an "overheat time."

The computer 105 can actuate the cooling component 145 to reduce the computer temperature. As described above, the cooling component 145 can be, e.g., a fan, a heat exchanger, etc., arranged to reduce the computer temperature. For example, the computer 105 can actuate a pump of a heat exchanger to move working fluid through the heat exchanger, moving heat from the computer 105 through the working fluid to a second working fluid, which absorbs the heat from the working fluid and expels the heat away from the computer 105. The working fluid and the second working fluid can be, e.g., air, water, coolant, etc. The computer 105 can actuate the cooling component 145 when the computer temperature exceeds the threshold during a trip 200. Alternatively, the computer 105 can actuate the cooling component when the computer temperature exceeds the threshold and the vehicle 101 is not on a trip 200.

The computer 105 can deactivate the cooling component 145 when the current computer temperature is below a second threshold. The second threshold can be lower than the threshold, e.g., 45° C. The second threshold can be determined based on a predicted temperature increase during operation of the vehicle 101, e.g., from empirical testing of computer temperatures. That is, the second threshold can be determined to allow the computer temperature to increase without exceeding the threshold during the next trip 200. For example, based on an average time duration of a typical trip 200, the second threshold can be determined such that typical operation of the vehicle 101 does not increase the computer temperature above the threshold for that average time duration. Because ambient air, other components 120, and/or insolation can increase the computer temperature on the trip 200, reducing the computer temperature to below the second threshold allows the computer temperature to increase slightly before requiring cooling from the cooling component 145.

The computer 105 can actuate the cooling component 145 at the overheat time when the overheat time is prior to the initiation time of the next assigned trip 200. When the vehicle 101 is on a trip 200, the computer 105 can actuate the cooling component 145 when the predicted computer temperature prior to the predicted end time exceeds the second threshold. That is, the computer 105 can actuate the cooling component 145 to reduce the computer temperature to below the second threshold so that the computer temperature may not subsequently rise above the threshold prior to the initiation time of a subsequent trip 200. The computer 105 can determine the deactivation time of the propulsion 140, as described above, and actuate the cooling component 145 to reduce the predicted computer temperature below the second threshold prior to the deactivation time.

The computer 105 can actuate the propulsion 140 at or prior to the overheat time to power the cooling component 145 to reduce the computer temperature. When the overheat time is prior to an initiation time of a next trip 200, the computer temperature will exceed the threshold prior to the initiation time. The computer 105 can actuate the propulsion 140 at the overheat time to power the cooling component 145, reducing the computer temperature prior to the initiation time. Thus, the computer temperature can remain below the threshold prior to the initiation time, improving operation of the computer 105 on the trip 200.

The computer 105 can communicate the overheat time to the server 130. As described above, the server 130 can assign trips 200 to vehicles 101. Based on the overheat time of a vehicle 101, the server 130 can assign a trip to the vehicle 101. For example, the server 130 can assign a trip 200 to a vehicle 101 that has an initiation time prior to the overheat time of the vehicle 101. Thus, the server 130 can assign trips 200 to prevent computer temperatures of vehicles 101 from exceeding the threshold, improving operation of the computers 105 of the vehicles 101.

Figure 3:
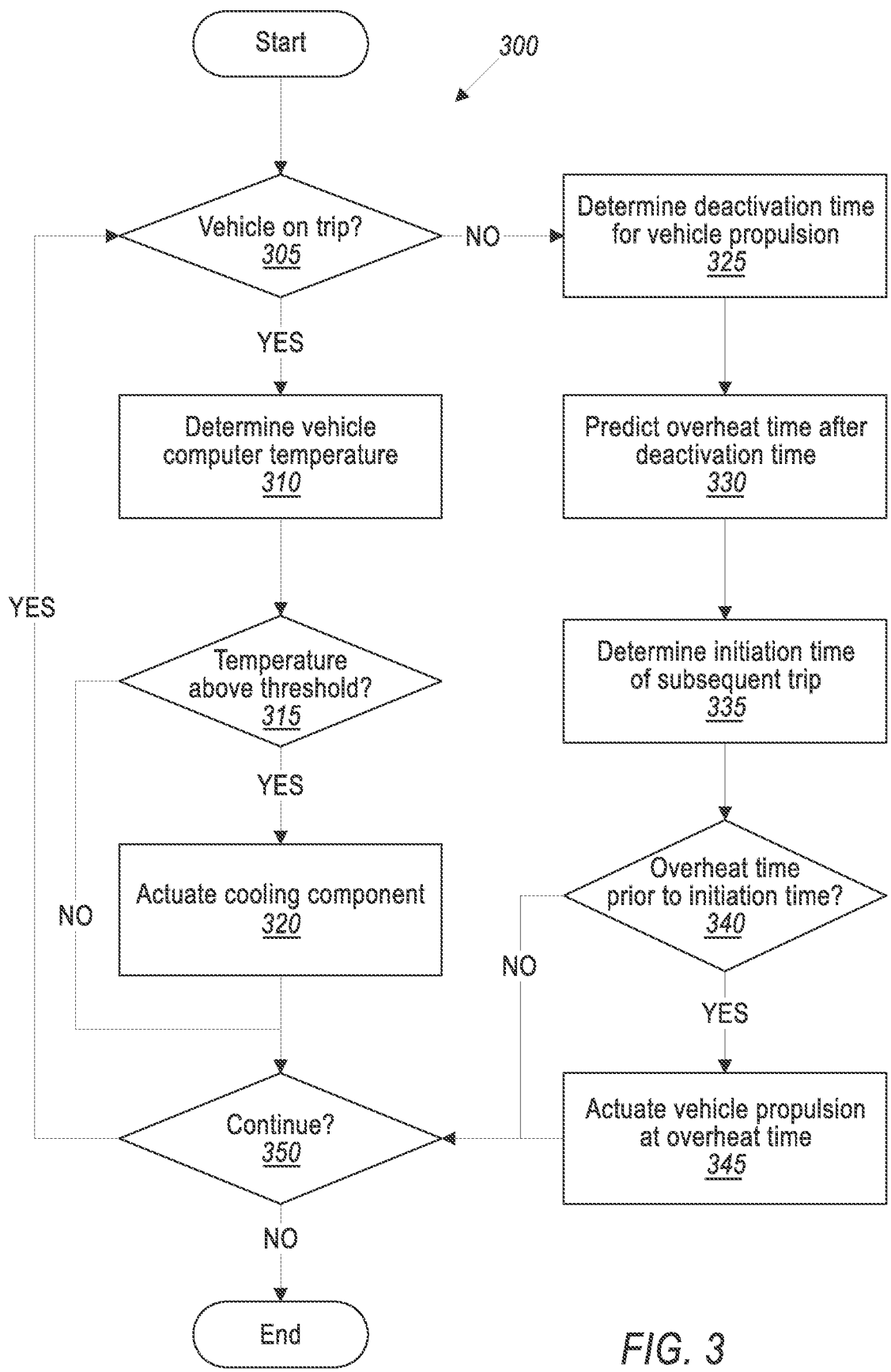
FIG. 3 is a block diagram of an example process for cooling the vehicle computer.

FIG. 3 is a block diagram of an example process 300 for cooling a computer 105 of a vehicle 101. The process 300 begins in a block 305, in which the computer 105 determines whether the vehicle 101 is currently on a trip 200. The computer 105 can receive an assignment for a trip 200 from the server 130 and actuate one or more components 120 to move the vehicle 101 from the origin 205 to the destination 210 defined by the trip 200. If the vehicle 101 is on a trip 200, the process 300 continues in a block 310. Otherwise, the process 300 continues in a block 325.

In the block 310, the computer 105 determines a current computer temperature. As described above, the computer 105 includes a temperature sensor 110 that measures the computer temperature. The temperature sensor 110 can be, e.g., a thermistor, a thermocouple, etc. For example, the temperature sensor 110 can be fixed to a processor of the computer 105. The computer 105 can actuate the temperature sensor 110 to collect data 115 about the computer temperature.

Next, in a block 315, the computer 105 determines whether the computer temperature is above a threshold. As described above, the threshold can be determined based on empirical testing of computer 105 performance at different temperatures. The threshold can be, e.g., 50° C. If the computer temperature is above the threshold, the process 300 continues in a block 320. Otherwise the process 300 continues in a block 350.

In the block 320, the computer 105 actuates a cooling component 145 to reduce the computer temperature. As described above, the cooling component 145 can be, e.g., a fan, a heat exchanger, etc. For example, the computer 105 can actuate a pump in a heat exchanger to move a working fluid to collect heat from the computer 105 and a second working fluid to move heat from the working fluid and expel the heat away from the computer 105.

In the block 325, the computer 105 determines a deactivation time for the propulsion 140. As described above, to conserve fuel, the computer 105 can deactivate the propulsion 140 after completing a trip 200 and prior to an initiation time of a next assigned trip 200. For example, upon moving to a standby location 215, the computer 105 can deactivate the propulsion 140 until the initiation time of the next assigned trip 200. The computer 105 can determine a time to deactivate the propulsion 140, i.e., the deactivation time.

Next, in a block 330, the computer 105 predicts an overheat time after the deactivation time. Upon deactivating the propulsion 140, the computer temperature can increase by receiving heat from, e.g., ambient hot air, insolation from the sun, etc. As described above, the overheat time is a predicted time at which the computer temperature will exceed the threshold. The computer 105 can predict the overheat time based on, e.g., a current computer temperature, an ambient air temperature, an insolation, etc.

Next, in a block 335, the computer 105 determines an initiation time for a subsequent trip 200. The server 130 can assign a subsequent trip 200 to the vehicle 101 that includes a scheduled pickup time from a user. Based on the pickup time, the computer 105 can determine the initiation time, at which time the computer 105 activates the propulsion 140 to initiate the trip 200. For example, the computer 105 can determine the initiation time based on a distance between a current location of the vehicle 101 and the origin 205 such that the vehicle 101 will arrive at the origin 205 at the scheduled pickup time.

Next, in a block 340, the computer 105 determines whether the overheat time is prior to the initiation time. If the overheat time is prior to the initiation time, the computer temperature will exceed the threshold prior to the computer 105 actuating the propulsion 140 at the initiation time, and thus prior to the computer 105 being able to actuate the cooling component 145. If the overheat time is after the initiation time, the computer 105 will actuate the propulsion 140 prior to the computer temperature exceeding the threshold to initiate the trip 200. If the overheat time is prior to the initiation time, the process 300 continues in a block 345. Otherwise, the process 300 continues in a block 350.

In the block 345, the computer 105 actuates the propulsion 140 at the predicted overheat time. Upon actuating the propulsion 140, the computer 105 can actuate the cooling component 145 to reduce the computer temperature. The computer 105 can actuate the cooling component 145 until the computer temperature is below the second threshold.

In the block 350, the computer 105 determines whether to continue the process 300. For example, the computer 105 can receive an assignment for a subsequent trip 200 and determine to continue the process 300 to maintain the computer temperature below the threshold. If the computer 105 determines to continue, the process 300 returns to the block 305. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory storing instructions executable by the processor to:
   actuate a temperature sensor to determine a current vehicle computer temperature;
   predict an overheat time based on inputting the current vehicle computer temperature to a thermal model, the overheat time being a time at which a predicted vehicle computer temperature will exceed a threshold; and
   actuate a cooling component when the overheat time is prior to an initiation time of a trip;
   wherein the thermal model predicts the overheat time based on the current vehicle computer temperature and at least one of a conduction, a convection, or a radiation heat transfer model.

2. The system of claim 1, wherein the instructions further include instructions to deactivate the cooling component when a current vehicle computer temperature is below a second threshold.

3. The system of claim 1, wherein the instructions further include instructions to, while on the trip, actuate the cooling component when a current vehicle computer temperature exceeds the threshold.

4. The system of claim 3, wherein the instructions further include instructions to deactivate the cooling component when the current vehicle computer temperature is below a second threshold.

5. The system of claim 1, wherein the instructions further include instructions to predict the vehicle computer temperature based on an ambient temperature.

6. The system of claim 1, wherein the instructions further include instructions to predict an end time for the trip and to actuate the cooling component when a predicted vehicle computer temperature prior to the end time exceeds a second threshold.

7. The system of claim 1, wherein the instructions further include instructions to, based on an end time of a first trip and an initiation time for a second trip, deactivate a vehicle propulsion.

8. The system of claim 7, wherein the instructions further include instructions to predict the overheat time based on a current vehicle computer temperature at a deactivation time of the vehicle propulsion.

9. The system of claim 7, wherein the instructions further include instructions to determine a deactivation time of the vehicle propulsion and to actuate the cooling component to reduce a predicted vehicle computer temperature below a second threshold prior to the deactivation time.

10. The system of claim 7, wherein the instructions further include instructions to activate the vehicle propulsion at the predicted overheat time when the predicted overheat time is prior to the initiation time of the second trip.

11. The system of claim 1, wherein the instructions further include instructions to assign a trip to a vehicle having an initiation time prior to the predicted overheat time of the vehicle.

12. The system of claim 1, wherein the instructions further include instructions to, upon completion of the trip, actuate a vehicle propulsion to move a vehicle to a standby location.

13. A method, comprising:
actuating a temperature sensor to determine a current vehicle computer temperature;
predicting an overheat time based on inputting the current vehicle computer temperature to a thermal model, the overheat time being a time at which a predicted vehicle computer temperature will exceed a threshold; and
actuating a cooling component when the overheat time is prior to an initiation time of a trip;
wherein the thermal model predicts the overheat time based on the current vehicle computer temperature and at least one of a conduction, a convection, or a radiation heat transfer model.

14. The method of claim 13, further comprising deactivating the cooling component when a current vehicle computer temperature is below a second threshold.

15. The method of claim 13, further comprising, based on an end time of a first trip and an initiation time for a second trip, deactivating a vehicle propulsion.

16. The method of claim 15, further comprising determining a deactivation time of the vehicle propulsion and actuating the cooling component to reduce a predicted vehicle computer temperature below a second threshold prior to the deactivation time.

17. A system, comprising:
a cooling component;
a vehicle computer;
means for actuating a temperature sensor to determine a current vehicle computer temperature;
means for predicting an overheat time based on inputting the current vehicle computer temperature to a thermal model, the overheat time being a time at which a predicted vehicle computer temperature will exceed a threshold; and
means for actuating the cooling component to cool the vehicle computer when the overheat time is prior to an initiation time of a trip;
wherein the thermal model predicts the overheat time based on the current vehicle computer temperature and at least one of a conduction, a convection, or a radiation heat transfer model.

18. The system of claim 17, further comprising means for deactivating the cooling component when a current vehicle computer temperature is below a second threshold.

19. The system of claim 17, further comprising means for deactivating a vehicle propulsion based on an end time of a first trip and an initiation time for a second trip.

20. The system of claim 19, further comprising means for determining a deactivation time of the vehicle propulsion and means for actuating the cooling component to reduce a predicted vehicle computer temperature below a second threshold prior to the deactivation time.

* * * * *